(12) United States Patent
Yoo et al.

(10) Patent No.: US 11,329,308 B2
(45) Date of Patent: May 10, 2022

(54) SECONDARY BATTERY CELL MODULE AND ASSEMBLING METHOD THEREOF

(71) Applicant: LG Chem, Ltd., Seoul (KR)

(72) Inventors: Jae Min Yoo, Daejeon (KR); Dal Mo Kang, Daejeon (KR); Jeong Oh Moon, Daejeon (KR); Jaeuk Ryu, Daejeon (KR); Su Chang Kim, Daejeon (KR); Ji Su Yoon, Daejeon (KR)

(73) Assignee: LG Energy Solution, Ltd.

( * ) Notice: Subject to any disclaimer, the term of this patent is extended or adjusted under 35 U.S.C. 154(b) by 20 days.

(21) Appl. No.: 16/617,259

(22) PCT Filed: Oct. 17, 2018

(86) PCT No.: PCT/KR2018/012275
§ 371 (c)(1),
(2) Date: Nov. 26, 2019

(87) PCT Pub. No.: WO2019/093671
PCT Pub. Date: May 16, 2019

(65) Prior Publication Data
US 2020/0350610 A1    Nov. 5, 2020

(30) Foreign Application Priority Data
Nov. 9, 2017    (KR) .......................... 10-2017-0148727

(51) Int. Cl.
*H01M 50/20* (2021.01)
*H01M 50/172* (2021.01)
(Continued)

(52) U.S. Cl.
CPC ..... *H01M 10/0422* (2013.01); *H01M 50/172* (2021.01); *H01M 50/20* (2021.01); *H01M 50/213* (2021.01)

(58) Field of Classification Search
CPC ............ H01M 10/04; H01M 10/0422; H01M 50/213; H01M 50/172
See application file for complete search history.

(56) References Cited

U.S. PATENT DOCUMENTS

| 5,578,392 A | 11/1996 | Kawamura |
| 2004/0229112 A1 | 11/2004 | Sharrow et al. |

(Continued)

FOREIGN PATENT DOCUMENTS

| CN | 101346832 A | 1/2009 |
| CN | 201655899 U | 11/2010 |

(Continued)

OTHER PUBLICATIONS

Mahcine Translation of: KR-1020160004545 A, Choo et al., Jan. 13, 2016.*

(Continued)

*Primary Examiner* — Kenneth J Douyette
(74) *Attorney, Agent, or Firm* — Lerner, David, Littenberg, Krumholz & Mentlik, LLP

(57) ABSTRACT

A method for assembling a secondary battery cell module by using an assembling jig including a plurality of guide rods disposed on a jig plate includes: mounting a lower frame on the jig plate while the guide rods are inserted into a plurality of arranging through-holes of the lower frame; disposing a plurality of battery cells on the lower frame; mounting an upper frame on the battery cells while the guide rods are inserted into a plurality of arranging through-holes of the upper frame; fastening the upper frame and the lower frame together; and separating the assembling jig from the upper frame and the lower frame.

6 Claims, 11 Drawing Sheets

(51) Int. Cl.
    *H01M 10/04*    (2006.01)
    *H01M 50/213*   (2021.01)

(56) References Cited

U.S. PATENT DOCUMENTS

| | | | |
|---|---|---|---|
| 2010/0136413 A1* | 6/2010 | Hermann | H01M 50/20 |
| | | | 429/149 |
| 2011/0008667 A1 | 1/2011 | Kwag et al. | |
| 2011/0143187 A1 | 6/2011 | Han et al. | |
| 2011/0148889 A1 | 6/2011 | Carter | |
| 2012/0148889 A1 | 6/2012 | Fuhr et al. | |
| 2018/0102519 A1 | 4/2018 | Tschiggfrei et al. | |
| 2018/0309101 A1 | 10/2018 | Nakai et al. | |
| 2019/0372069 A1 | 12/2019 | Lee et al. | |
| 2020/0194853 A1 | 6/2020 | Yoo et al. | |

FOREIGN PATENT DOCUMENTS

| | | | |
|---|---|---|---|
| CN | 103390762 A | | 11/2013 |
| CN | 205609614 U | | 9/2016 |
| CN | 106531918 A | | 3/2017 |
| CN | 207381455 U | | 5/2018 |
| JP | H09007564 A | | 1/1997 |
| JP | 2011049013 A | | 3/2011 |
| JP | 2012243514 A | | 12/2012 |
| JP | 2013109977 A | | 6/2013 |
| JP | 2014229681 A | | 12/2014 |
| JP | 2014229725 A | | 12/2014 |
| JP | 2018512720 A | | 5/2018 |
| JP | 2020520072 A | | 7/2020 |
| JP | 2020514978 | | 5/2021 |
| KR | 101108184 B1 | | 2/2012 |
| KR | 101247390 B1 | | 3/2013 |
| KR | 20140008123 A | | 1/2014 |
| KR | 20140087780 A | | 7/2014 |
| KR | 20150120916 A | | 10/2015 |
| KR | 20150121987 A | | 10/2015 |
| KR | 1020160004545 A1 * | | 1/2016 |
| KR | 20160002834 U | | 8/2016 |
| KR | 20170011206 A | | 2/2017 |
| KR | 101778668 B1 | | 9/2017 |
| WO | 2016155846 A1 | | 10/2016 |
| WO | 2017068708 A1 | | 4/2017 |

OTHER PUBLICATIONS

Search report from International Application No. PCT/KR2018/012275, dated Apr. 3, 2019.
Extended European Search Report for Application No. EP 18876473.2 dated Apr. 23, 2020, 7 pages.
Chinese Search Report for Application No. 201880039111.X dated Nov. 1, 2021, 3 pages.

* cited by examiner

SECONDARY BATTERY CELL MODULE AND ASSEMBLING METHOD THEREOF

CROSS-REFERENCE TO RELATED APPLICATIONS

The present application is a national phase entry under 35 U.S.C. § 371 of International Application No. PCT/KR2018/012275, filed Oct. 17, 2018, published in Korean, which claims priority to Korean Patent Application No. 10-2017-0148727 filed on Nov. 9, 2017 in the Republic of Korea, the disclosures of which are incorporated herein by reference.

TECHNICAL FIELD

The present invention relates to a secondary battery cell module and an assembling method thereof.

BACKGROUND ART

The use of a secondary battery which may be semi-permanently used by recharging it is being gradually extended to power sources of vehicles as well as a power supply of a portable electronic device. In the case of the portable electronic device, a secondary battery made of a single cell is used, and in the case of the secondary battery used as a power source of vehicles, a battery pack in which a plurality of battery cells are mounted in a module to realize high capacity, and a plurality of modules are disposed according to a predetermined arrangement, is configured.

Depending on shapes of battery cells, there are various methods for mounting a plurality of battery cells in a single module, and in the case of a bar-type battery cell such as with a cylindrical shape, a bar-type battery cell is disposed between an upper frame and a lower frame, and the upper frame and the lower frame are fixed by fastening the same. In this case, the assembling of upper/lower frames and a battery cell is performed in order of arranging battery cells on a lower frame, putting an upper frame on them, and fastening the upper/lower frames. However, a plurality of cells must be simultaneously assembled, so assembling defects may be generated by assembling tolerance of respective cells, and to compensate for this, an additional process such as a process for fixing cells on the lower frame by use of an adhesive is performed, thereby increasing time and cost of the assembling process.

DISCLOSURE

Technical Solution

The present invention has been made in an effort to provide a method for assembling a secondary battery cell module for assembling a plurality of battery cells and upper/lower frames without using an additional process such as fixation of cells using an adhesive, and a secondary battery cell module assembled by the method.

An exemplary embodiment of the present invention provides a method for assembling a secondary battery cell module by using an assembling jig including a plurality of guide rods disposed on a jig plate, including: mounting a lower frame on the jig plate while the guide rods are inserted into a plurality of arranging through-holes of the lower frame; disposing a plurality of battery cells on the lower frame; mounting an upper frame on the battery cells while the guide rods are inserted into a plurality of arranging through-holes of the upper frame; fastening the upper frame and the lower frame together; and separating the assembling jig from the upper frame and the lower frame.

The method for assembling a secondary battery cell module may further include mounting a bottom plate on the jig plate while the guide rods are inserted into a plurality of holes in the bottom plate before the mounting of the lower frame on the jig plate, and the separating of the assembling jig from the upper frame and the lower frame may be performed by separating the bottom plate from the jig plate.

An arranging through-hole of the lower frame and an arranging through-hole of the upper frame may be disposed at mutually corresponding positions, respective numbers of arranging through-holes of the lower frame and arranging through-holes of the upper frame may be greater than a number of the guide rods of the assembling jig, and at least one of the plurality of battery cells has a cylindrical shape.

Another embodiment of the present invention provides a secondary battery cell module including: a lower frame including a plurality of triangular columns, a plurality of connectors each for connecting three adjacent ones of the plurality of triangular columns, and a plurality of supports each protruding from a respective one of the plurality of connectors; an upper frame including a plurality of triangular columns, a plurality of connectors each for connecting three adjacent ones of the plurality of triangular columns of the upper frame, and a plurality of supports each protruding from a respective one of the plurality of connectors of the upper frame; and a plurality of battery cells interposed between the lower frame and the upper frame, wherein arranging through-holes may be formed in at least two of the plurality of connectors of the lower frame and at least two of the plurality of connectors of the upper frame, and an arranging through-hole of the lower frame and the arranging through-hole of the upper frame may be disposed at mutually corresponding positions.

The arranging through-holes may be formed in more than two of the plurality of connectors of the lower frame and more than two of the plurality of connectors of the upper frame.

Three auxiliary walls respectively connected to an edge of the triangular column may be further formed on a plurality of connectors of the lower frame and a plurality of connectors of the upper frame, the arranging through-hole is disposed at a center portion in which the auxiliary wall of the connector may not be provided, respective triangular columns of the lower frame and the upper frame may include three arc-shaped wall sides and three straight sides for connecting adjacent ones of the arc-shaped wall sides, and at least one of the plurality of battery cells may have a cylindrical shape.

A secondary battery pack is configured by receiving the secondary battery cell module according to an exemplary embodiment of the present invention in a lower case and covering the same with an upper case.

Another embodiment of the present invention provides a jig for assembling a secondary battery cell module, including: a jig plate; and a plurality of guide rods disposed at predetermined intervals on the jig plate.

Advantageous Effects

When the method for assembling a secondary battery cell module according to an exemplary embodiment of the present invention is used, the battery cell modules may be accurately arranged on the lower frame, and the upper frame may be accurately disposed on the arranged battery cell modules to thereby prevent assembling defects.

Further, the process for assembling a secondary battery cell module may be simplified by omitting the additional process such as fixation of cells using an adhesive, and the assembling time and cost may be reduced.

MODE FOR INVENTION

Figure 1:
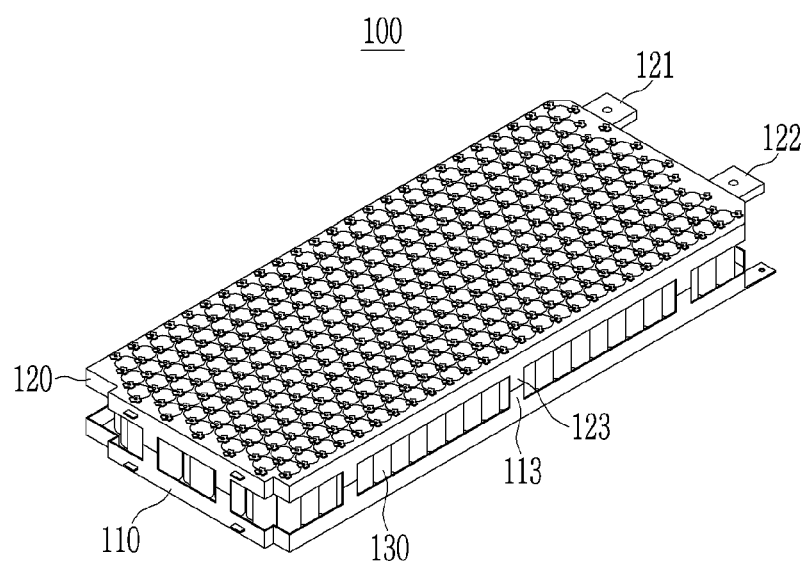
FIG. 1 shows a perspective view of a secondary battery cell module according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 shows a perspective view of a secondary battery cell module according to an exemplary embodiment of the present invention.

Referring to FIG. 1, the secondary battery cell module 100 according to an exemplary embodiment of the present invention includes a lower frame 110, an upper frame 120, and a plurality of battery cells 130 interposed therebetween. The battery cell 130 is formed to have a long bar shape, and the present exemplary embodiment exemplifies a cylindrical battery cell 130. Positive and negative access terminals 121 and 122 are installed in the upper frame 120, and a plurality of upper fasteners 123 are formed thereon. A lower fastener 113 for combination with the upper fastener 123 is formed on the lower frame 110. The lower fastener 113 and the upper fastener 123 fasten the lower frame 110 and the upper frame 120 to fix the same through female and male combination.

A configuration of the upper and lower frames 110 and 120 of the secondary battery cell module 100 according to an exemplary embodiment of the present invention will now be described with reference to FIG. 2 and FIG. 3.

Figure 2:
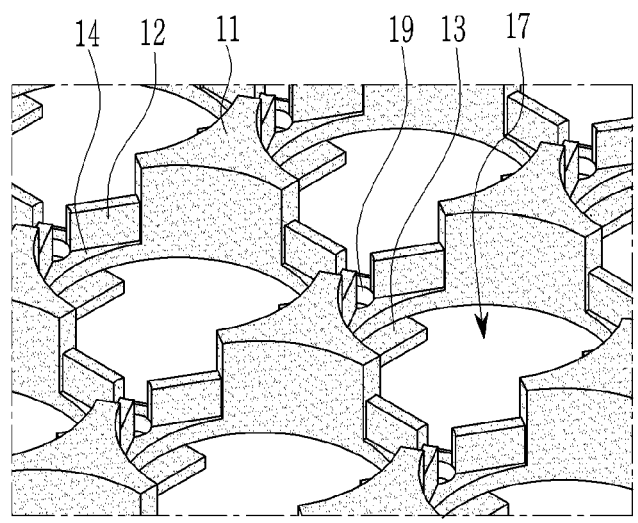
FIG. 2 shows a perspective view of an enlarged portion of an upper frame or a lower frame of a secondary battery cell module according to an exemplary embodiment of the present invention.
Figure 3:
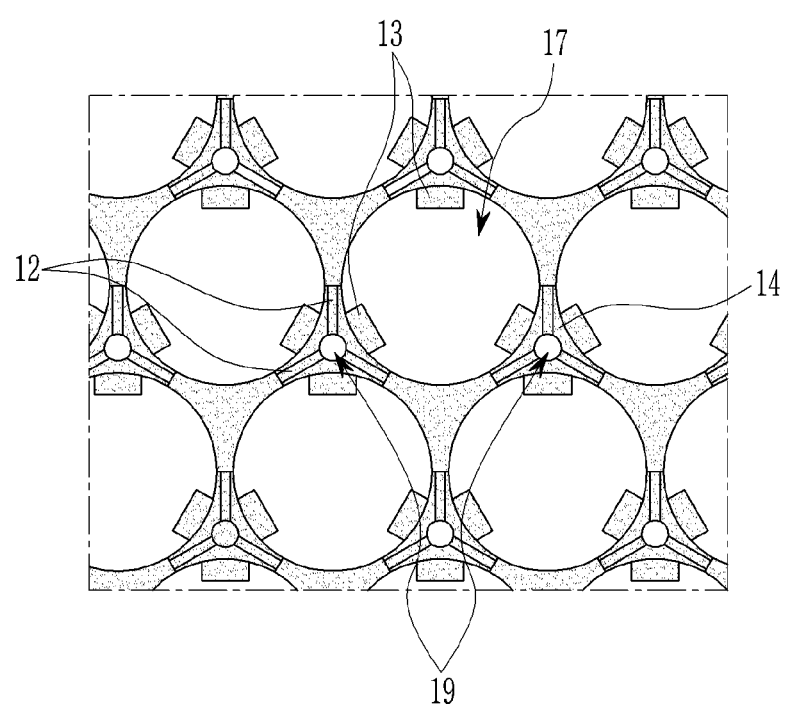
FIG. 3 shows a top plan view of an enlarged portion of an upper frame or a lower frame of a secondary battery cell module according to an exemplary embodiment of the present invention.

FIG. 2 shows a perspective view of an enlarged portion of an upper frame or a lower frame of a secondary battery cell module according to an exemplary embodiment of the present invention, and FIG. 3 shows a top plan view of an enlarged portion of an upper frame or a lower frame of a secondary battery cell module according to an exemplary embodiment of the present invention.

Referring to FIG. 2 and FIG. 3, the upper frame 120 or the lower frame 110 of the secondary battery cell module includes a cell region 17 for receiving a cylindrical battery cell 130. The cell region 17 is formed by a plurality of triangular columns 11 formed near the same, a connector 14 for connecting three adjacent triangular columns 11, a plurality of auxiliary walls 12 formed on the connector 14 and connected to one edge of the triangular column 11, and a support 13 protruding toward the cell region 17 from the connector 14. Each the cell region 17 is surrounded by three triangular columns 11 and three connectors 14 connecting them, and three supports 13 protruding from the three connectors 14 prevent the battery cell 130 from leaving the cell region 17. A wall side corresponding to three sides of the triangular column 11 has a circular arc-shaped curve, and a portion corresponding to an apex is a rectangular straight side. Three auxiliary walls 12 are disposed on each connector 14, a portion in which no auxiliary wall 12 is provided is provided on a center of the connector 14, and an arranging through-hole 19 is formed on the portion. The arranging through-hole 19 represents a hole for allowing a guide rod to pass therethrough, wherein the guide rod is used to accurately arrange the upper and lower frames 110 and 120 and a plurality of battery cells 130 during a process for arranging the battery cells 130 on the lower frame 110 and putting the upper frame 120 thereon to assemble the same.

FIG. 2 and FIG. 3 exemplify a case in which the arranging through-hole 19 is formed in each connector 14, and the same may be formed in only some of the connectors 14. The arranging through-holes 19 may be uniformly distributed on the whole upper and lower frames 110 and 120 according to a predetermined rule, and when the arranging through-hole 19 is formed at a predetermined position of the lower frame 110, an arranging through-hole 19 is also formed at a corresponding position at the upper frame 120. That is, the disposing positions of the arranging through-holes 19 are the same on the upper frame 120 and the lower frame 110.

A method for assembling a secondary battery cell module according to an exemplary embodiment of the present invention will now be described with reference to FIG. 4 to FIG. 9.

Figure 4:
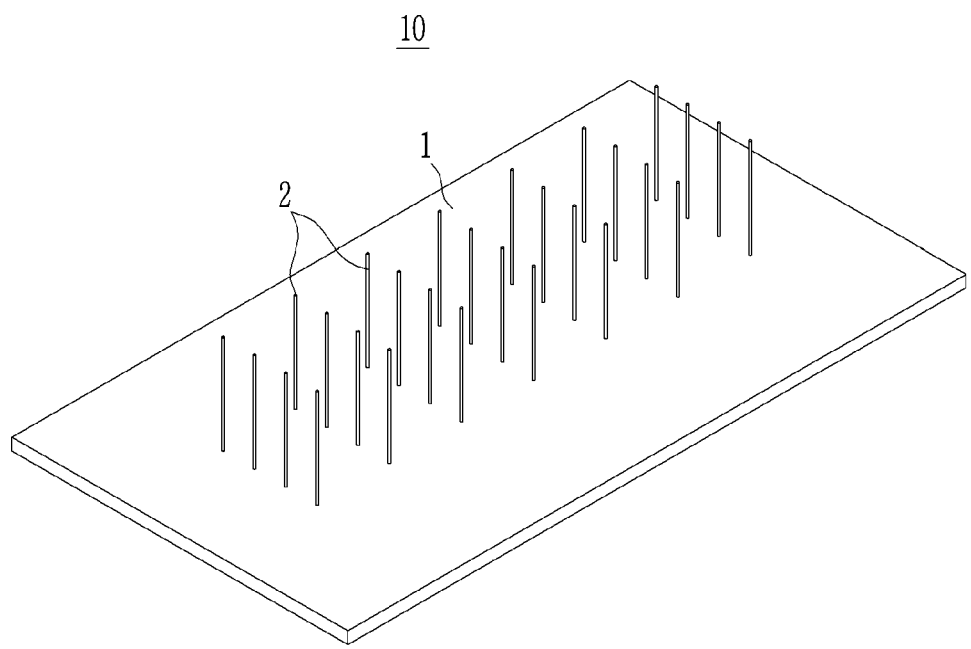
FIG. 4 shows a perspective view of an assembling jig used in a method for assembling a secondary battery cell module according to an exemplary embodiment of the present invention.

FIG. 4 shows a perspective view of an assembling jig used in a method for assembling a secondary battery cell module according to an exemplary embodiment of the present invention, and FIG. 5 to FIG. 9 show perspective views for sequentially showing a process for assembling a secondary battery cell module according to an exemplary embodiment of the present invention.

Referring to FIG. 4, the assembling jig 10 is configured with a jig plate 1 and a plurality of guide rods 2 disposed thereon at predetermined intervals.

Figure 5:
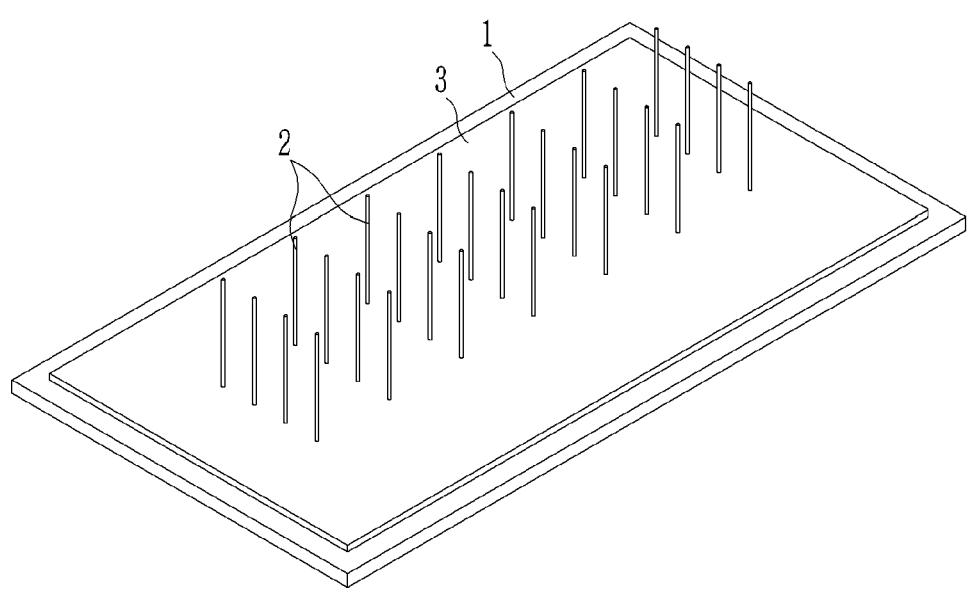
FIG. 5 to FIG. 9 show perspective views for sequentially showing a process for assembling a secondary battery cell module according to an exemplary embodiment of the present invention.

As shown in FIG. 5, a bottom plate 3 is provided on the jig plate 1 of the assembling jig 10. A plurality of holes (not shown) corresponding to the respective guide rods 2 are formed in the bottom plate 3, so the bottom plate 3 is provided on the jig plate 1 as the guide rod 2 passes through the same. The number of holes formed in the bottom plate 3 may be equal to or greater than the number of guide rods 2. The bottom plate 3 may be formed with an elastic material such as a rubber so that it may function to absorb an impact between the assembling jig 10 and the lower frame 110.

Figure 6:
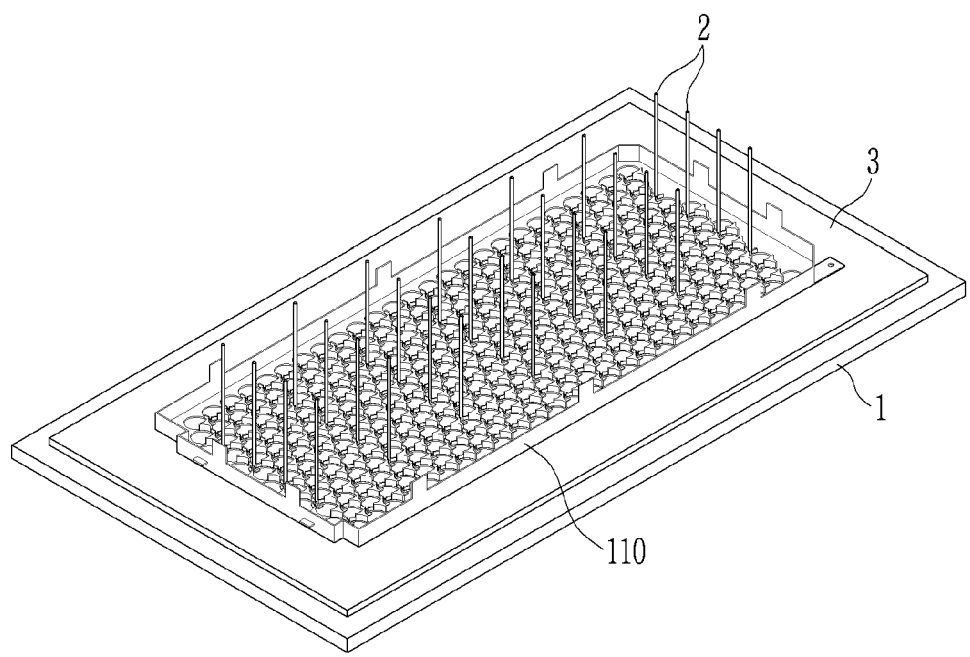

As shown in FIG. 6, the lower frame 110 is disposed on the bottom plate 3. In this instance, the guide rod 2 passes through the arranging through-hole 19 of the lower frame 110 described with reference to FIG. 2 and FIG. 3 to protrude upward, and the lower frame 110 is provided on the bottom plate 3. In this instance, the number of arranging through-holes 19 may be equal to or greater than the number of guide rods 2.

Figure 7:
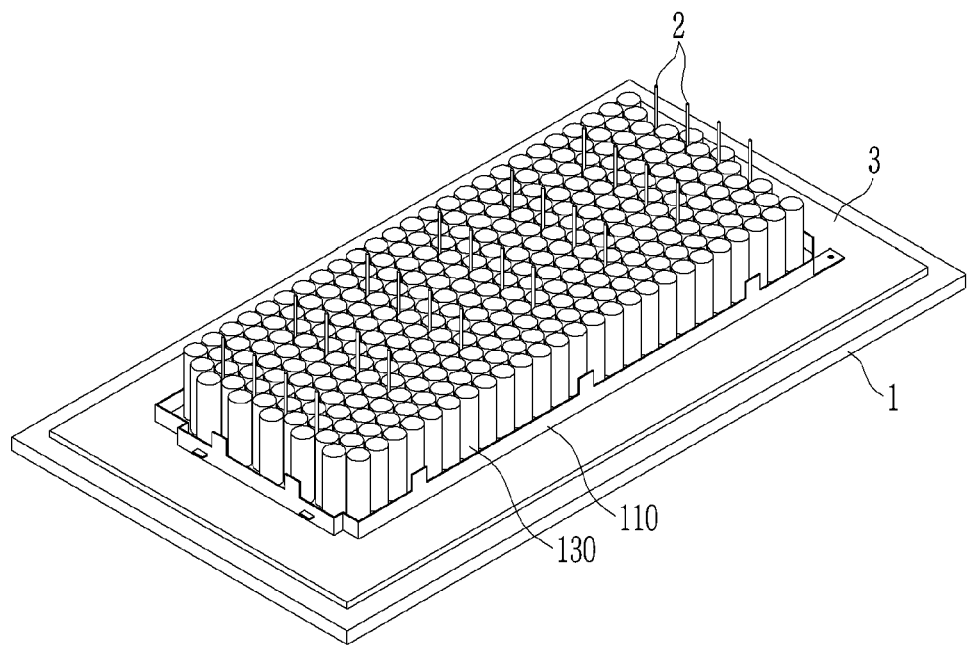

As shown in FIG. 7, a plurality of battery cells 130 are disposed on the lower frame 110. The battery cell 130 is received in the cell region 17 of the lower frame 110 described with reference to FIG. 2 and FIG. 3, and its downward movement is limited by the support 13 described with reference to FIG. 2 and FIG. 3. In this instance, the guide rod 2 protrudes over the battery cell 130 passing through a space between the battery cells 130.

Figure 8:
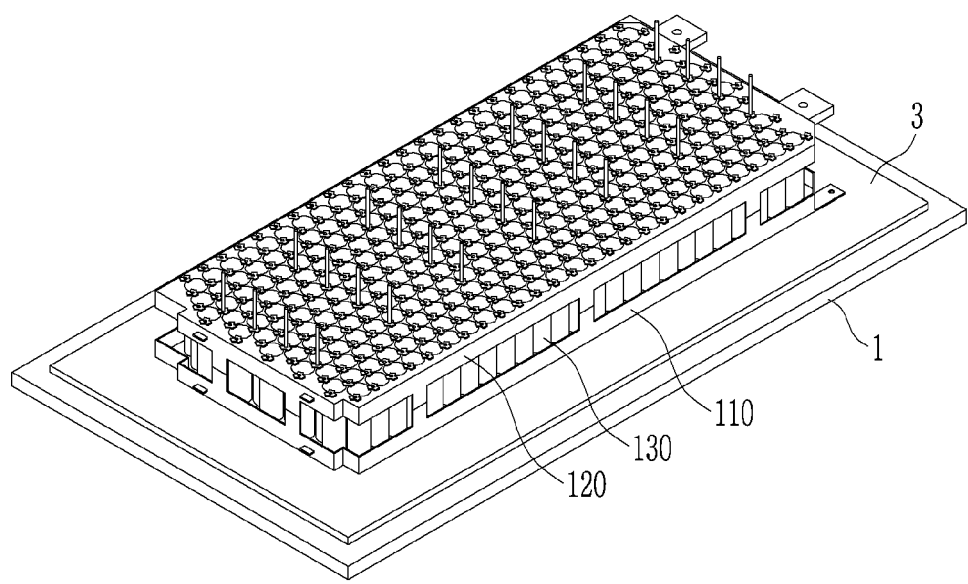

As shown in FIG. 8, the upper frame 120 is mounted on a plurality of battery cells 130, and the upper fastener 123 and the lower fastener 113 described with reference to FIG. 1 are combined to each other to thus fix the upper frame 120 and the lower frame 110. In this instance, the guide rod 2 passes through the arranging through-hole 19 of the upper frame 120 and protrudes upward, one battery cell 130 is received in the cell region 17 of the upper frame 120, and the movement in the upward direction by the battery cell 130 is limited by the support 13. The number of arranging through-holes 19 may be equal to or greater than the number of guide rods 2.

Figure 9:
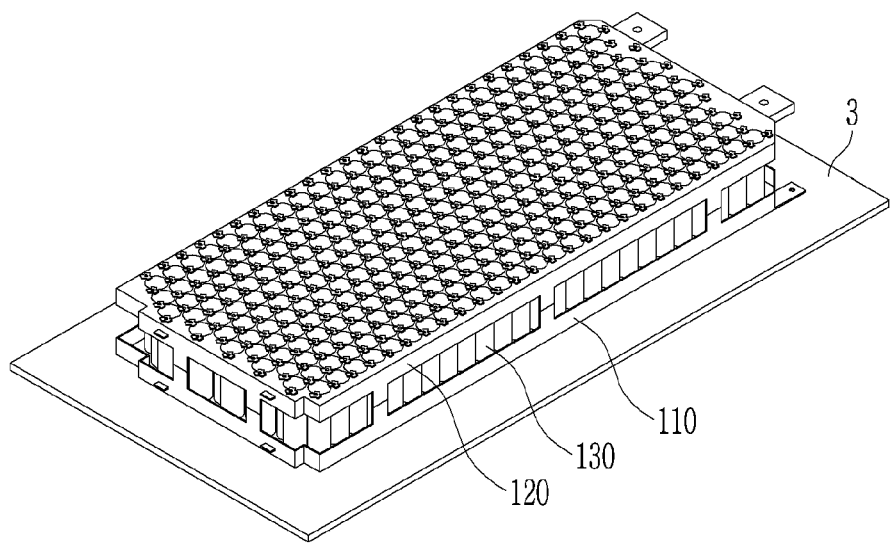

As shown in FIG. 9, the assembling jig 10 is separated by lifting the bottom plate 3 together with the assembled secondary battery cell module 100. When the bottom plate 3 is separated, the secondary battery cell module as shown in FIG. 1 is obtained.

The secondary battery pack is manufactured by receiving the assembled secondary battery cell module in the upper/lower cases.

Figure 10:
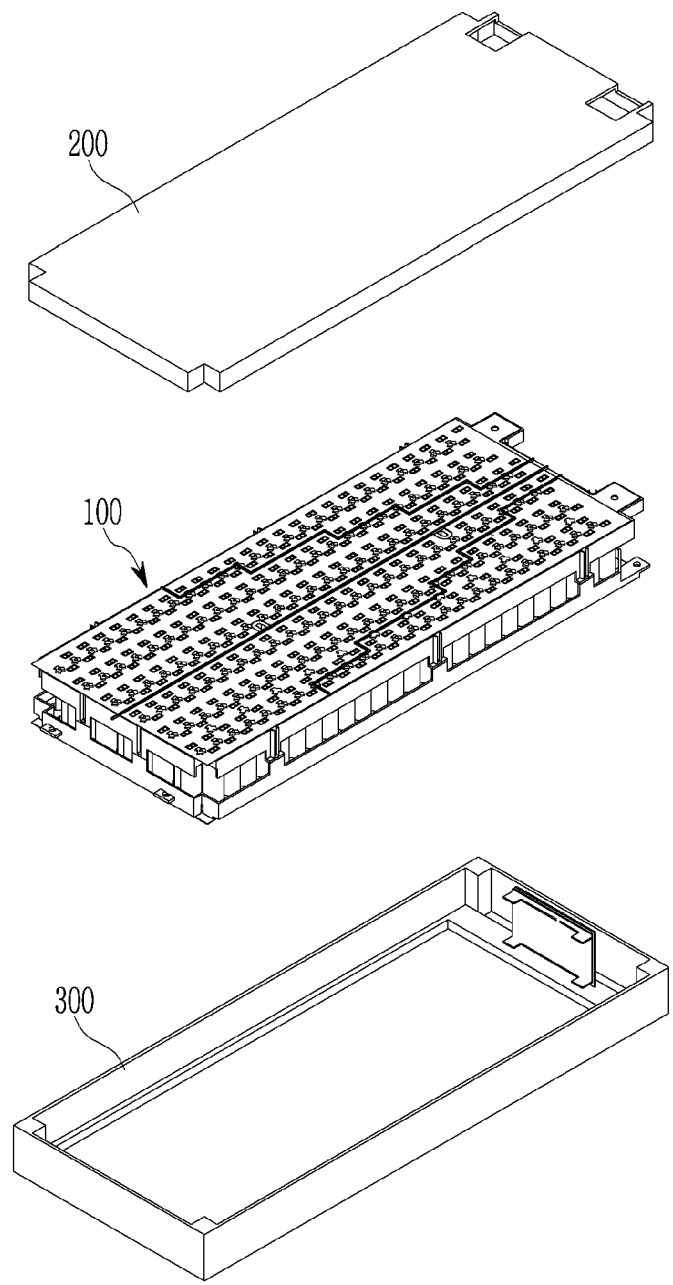
FIG. 10 shows an exploded perspective view of a process for receiving a secondary battery cell module in an upper/lower case and manufacturing a secondary battery pack according to an exemplary embodiment of the present invention.
Figure 11:
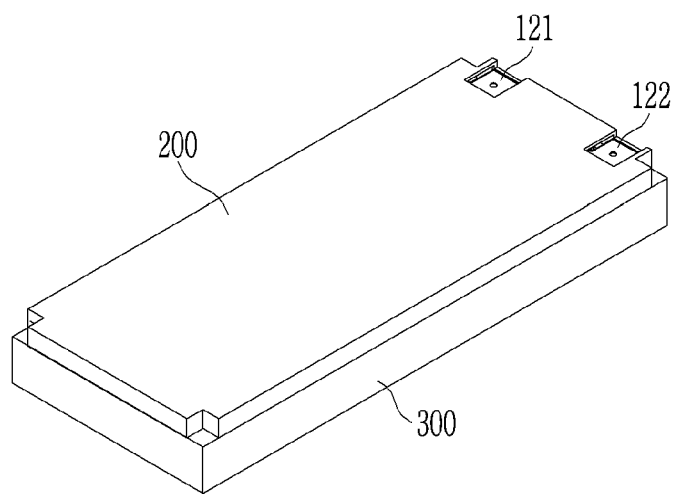
FIG. 11 shows a perspective view of a secondary battery pack manufactured by receiving a secondary battery cell module in an upper/lower case according to an exemplary embodiment of the present invention.

FIG. 10 shows an exploded perspective view of a process for receiving a secondary battery cell module in an upper/lower case and manufacturing a secondary battery pack according to an exemplary embodiment of the present invention, and FIG. 11 shows a perspective view of a secondary battery pack manufactured by receiving a secondary battery cell module in an upper/lower case according to an exemplary embodiment of the present invention.

The secondary battery pack shown in FIG. 10 is manufactured, as shown in FIG. 11, by receiving the assembled secondary battery cell module 100 in a lower case 300 and covering the same with an upper case 200. In this instance, the two access terminals 121 and 122 may be exposed through an opening of the upper case.

When the secondary battery cell module is assembled according to the above-described method, the battery cell modules may be accurately arranged on the lower frame, and the upper frame may be accurately disposed on the arranged battery cell modules thereby preventing assembling defects. Further, by omitting additional process such as fixation of cells by use of an adhesive, the process for assembling a secondary battery cell module is simplified, thereby reducing the assembling time and cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for assembling a secondary battery cell module by using an assembling jig including a plurality of guide rods disposed on a jig plate, the method comprising:
   mounting a lower frame on the jig plate while the guide rods are inserted into a plurality of arranging through-holes of the lower frame;
   disposing a plurality of battery cells on the lower frame;
   mounting an upper frame on the battery cells while the guide rods are inserted into a plurality of arranging through-holes of the upper frame;
   fastening the upper frame and the lower frame together; and
   separating the assembling jig from the upper frame and the lower frame.

2. The method of claim 1, further comprising
   mounting a bottom plate on the jig plate while the guide rods are inserted into a plurality of holes in the bottom plate before the mounting of the lower frame on the jig plate.

3. The method of claim 2, wherein
   the separating of the assembling jig from the upper frame and the lower frame is performed by separating the bottom plate from the jig plate.

4. The method of claim 1, wherein
   an arranging through-hole of the lower frame and an arranging through-hole of the upper frame are disposed at mutually corresponding positions.

5. The method of claim 4, wherein
   respective numbers of arranging through-holes of the lower frame and arranging through-holes of the upper frame are greater than a number of the guide rods of the assembling jig.

6. The method of claim 1, wherein
   at least one of the plurality of battery cells has a cylindrical shape.

* * * * *